Oct. 3, 1967     T. A. STOTEN     3,344,988
COUNTER-BOXES
Filed Nov. 12, 1965

INVENTOR
Terence Arthur Stoten
BY
Baldwin & Wight
ATTORNEYS

United States Patent Office 3,344,988
Patented Oct. 3, 1967

3,344,988
COUNTER-BOXES
Terence Arthur Stoten, Barton, England, assignor to
George Kent Limited
Filed Nov. 12, 1965, Ser. No. 507,406
Claims priority, application Great Britain, Nov. 18, 1964,
46,966/64
4 Claims. (Cl. 235—117)

ABSTRACT OF THE DISCLOSURE

A counter-box for a fluid flow meter has a counter wheel, an indicator part cooperable therewith for indicating the position at which an indication on the counter wheel is to be read, and a viewing window in a corner of a casing housing the counter wheel so relatively positioned that a reading may be taken from points within an arc of at least 90°. The axis of rotation of the counter wheel, the aforesaid casing corner, and the viewing position lie substantially along an imaginary straight line.

---

Figure 1:
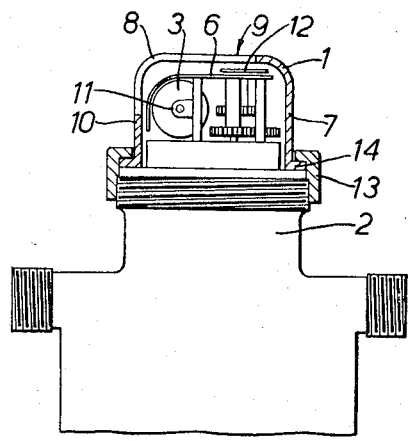

The present invention concerns counter-boxes for fluid flow meters. Usually counter-boxes are mounted on meters in such a manner that they can be read by looking downwardly, thus enabling their associated meters to be mounted underground. If however, the same type of meter was required to be mounted in a position where it was impossible to view it from above, then the meter would have to be positioned so that the counter was readable. This is not desirable with certain types of meters since there can be a change of accuracy if the meter is not mounted in the position in which it was calibrated. Inferential meters, for example, are usually designed and calibrated to be mounted with the rotor axis in a vertical plane and if such a meter was installed with the axis horizontal the rotor could under some circumstances completely stall. Semi-positive meters are not generally affected to the same extent but in certain applications the accuracy can be changed to a value outside the user's acceptable limits if the meter is not installed in the position in which it was calibrated. It has been the practice to design meters with various interchangeable counter-boxes so that they can be calibrated in a standard position and the appropriate type of counter-boxes then selected for a particular location. This practice has the disadvantage that it complicates the manufacturing and ordering systems and increases the number of different types of spares held by the users of the meters. It is also a disadvantage to the user who orders in bulk without knowing precisely what type of installation the meters are eventually to be used on.

According to the present invention a counter-box adapted for use with a fluid flow meter comprises a rotary counter which is displayed beneath a window in an outer casing, the window extending into two sides of the casing, thus the counter reading can be viewed through an arc of at least 90°.

The rotary counter may co-operate with an indicator part which denotes the operative reading thereon, the indicator part being arranged so that an imaginary line joining the operative reading position with the axis of rotation of the rotary counter passes approximately through or near the point where the lines of extent of the two sides of the casing into which the window extends would meet.

Preferably the angles between the imaginary line joining the operative reading position with the axis of rotation of the rotary counter and the lines of extent of the sides of the casing into which the window extends are substantially equal.

In a convenient arrangement the rotary counter is in the form of a rotary counter wheel on the periphery of which the readings are carried and the indicator part is in the form of a dial plate having an aperture therein through which the operative reading on the counter is presented.

The dial plate may be curved about the periphery of the counter wheel and in many cases may also carry means for indicating readings from at least one other counter.

In a preferred arrangement the window in the casing is of curved transparent material.

According to another feature of the invention the counter-box is adapted for mounting on a meter in a number of alternative positions.

Thus, the counter-box may be arranged so that it can be rotationally adjusted relative to the meter in a plane parallel to the axis of rotation of the counter wheel. The invention also includes a counter-box as set forth in combination with a meter.

Figure 2:
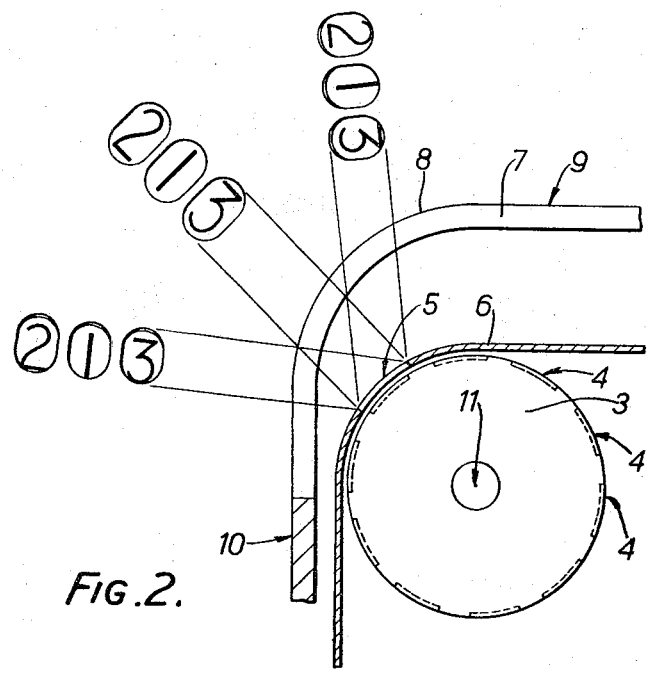

The invention may be performed in various ways but one embodiment will now be described by way of example, and with reference to the accompanying drawings in which:

FIGURE 1 is a cross section through a counter-box according to the invention, and FIGURE 2 is an enlarged view of part of the counter-box shown in FIGURE 1.

In the arrangement to be described a counter-box of the cyclometer type is indicated at 1 mounted on the top of a fluid flow meter 2. This counter box has a series of co-axially mounted, axially spaced counter wheels 3 which register in well known manner the total fluid flow through the meter 2, each of the counter wheels 3 carrying on its periphery the indicia or numbers 0–9 indicated at 4 so that these can be presented successively to a reading position at an associated viewing aperture 5 in a dial plate 6 part of which curves about their peripheries, this dial plate thus forming an indicator part which denotes the operative reading.

An outer casing 7 encloses and protects the dial plate 6 and the mechanism and is either made of transparent material or as shown in the drawing, has a window 8 through which the viewing apertures 5 of the dial plate 6 are visible, the window extending into two sides 9 and 10 of the casing, which respectively form the top and a side wall.

The dial plate 6 curves through 90° and the counter wheels 3 are mounted within this curve which is concentric with the axis of rotation 11 of the counter wheels, the viewing apertures 5 being formed in the apex of the curve of the dial plate so that an imaginary line joining the operative reading position with the axis of rotation 11 of the wheels passes approximately through or near the point where the two sides 9 and 10 of the casing into which the window extends would meet. Otherwise stated, the axis of rotation of the counter wheel, the reading position, and the corner of the casing at which the two lines of extent of the sides 9 and 10 of the casing meet, lie substantially along an imaginary straight line.

The curvature of the counter wheels 3 together with the positioning and shape of the viewing apertures 5 enable the operative readings on the counter wheels to be viewed from any point within an arc of approximately 90° in the plane of rotation of the counter wheels, and as the window 8 extends into both the vertical and horizontal planes the readings on the counter-box can be read from either a horizontal or a vertical direction.

The dial plate 6 also carries means for indicating the readings from another counter which is in the form of a rotating dial 12 which is parallel with the upper surface of the dial plate 6 and which indicates fractions of the main reading shown on the counter wheels 3. Such fractions of the main reading are used for the purpose of calibration and would not normally be required to be read by the user, but the window is arranged so that the readings can also be viewed.

The counter-box can be mounted on the meter in a number of angularly displaced positions in the plane of the axis 11 of the counter wheels 3 so that its readings can be read from any desired direction irrespective of the input and output connections to the meter itself.

To accommodate the various positions the counter-box is clamped to the meter by a screw threaded clamping ring 13 which co-operates with a flange 14 on the casing 7. The clamping ring 13 can be slackened to enable the box to be rotated relative to the meter into its desired position.

Various other methods not shown of clamping the counter-box in position can be used, for example, the clamp could be in the form of a clamp plate which fits over the flange on the bottom of the counter-box and which is secured by screws which screw into the meter body. Alternatively screw holes can be provided in the flange itself with the screw screwing into the meter body. Thus, with four fixing holes the counter-box could then be secured in any one of four positions.

What I claim is:

1. In a counter-box for a fluid flow meter, the combination of a counter wheel rotatable about an axis and having indicia deployed around its periphery; a casing housing said counter wheel; and an indicator part for indicating the reading position at which an indication on said counter wheel is to be read, said indicator part comprising means within said casing, adjacent to said counter wheel and between said counter wheel and a corner of said casing for delineating an area on the periphery of said counter wheel containing any one of said indicia, according to the position of said counter wheel, thereby to establish said reading position, said casing having two sides extending respectively along two lines which meet at said corner of the casing, said casing having a window which extends from said corner into said two sides, said corner of said casing and said reading position lying substantially on an imaginary straight line which intersects said axis of rotation of said counter wheel and is substantially normal to said axis.

2. A counter-box as claimed in claim 1 in which the angles between said imaginary straight line and said two lines, respectively, are substantially equal.

3. A counter-box as claimed in claim 1 in which said indicator part comprises a dial plate having an aperture through which an indication on said counter wheel in said reading position is viewable.

4. A counter-box as claimed in claim 3 in which the dial plate is curved about the periphery of the counter wheel.

References Cited
UNITED STATES PATENTS

| | | | |
|---|---|---|---|
| 1,824,781 | 9/1931 | La Bar | 58—53 |
| 1,826,520 | 10/1931 | McGowan | 235—117 |
| 1,984,561 | 12/1934 | Zinke | 177—177 |
| 2,443,745 | 6/1948 | Montgomery | 116—124.1 |
| 2,762,253 | 9/1956 | Williams | 177—177 |
| 2,777,637 | 1/1957 | Matthew | 235—103 |
| 2,979,258 | 4/1961 | Van Allen | 235—103 |
| 3,177,646 | 4/1965 | Ernest et al. | 58—53 |
| 3,202,127 | 8/1965 | Struble et al. | 235—103 |

RICHARD B. WILKINSON, *Primary Examiner.*

STANLEY WAL, *Assistant Examiner.*